(12) United States Patent
Pathak (10) Patent No.: US 12,077,210 B2
(45) Date of Patent: Sep. 3, 2024

(54) VEHICLE STEERING CONTROL SYSTEM

(71) Applicant: STEERING SOLUTIONS IP HOLDING CORPORATION, Saginaw, MI (US)

(72) Inventor: Abhishek Pathak, Royal Oak, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 66 days.

(21) Appl. No.: 16/789,641

(22) Filed: Feb. 13, 2020

(65) Prior Publication Data

US 2021/0253167 A1 Aug. 19, 2021

(51) Int. Cl.
*B62D 15/02* (2006.01)
*B62D 5/04* (2006.01)
*B62D 6/00* (2006.01)

(52) U.S. Cl.
CPC ......... *B62D 15/0285* (2013.01); *B62D 5/046* (2013.01); *B62D 6/002* (2013.01); *B62D 15/021* (2013.01); *B62D 15/029* (2013.01)

(58) Field of Classification Search
CPC .... B62D 15/0285; B62D 5/046; B62D 6/002; B62D 15/021; B62D 15/029; B62D 15/027; B62D 5/003; B60K 2370/1868; B60W 30/06
See application file for complete search history.

(56) References Cited

U.S. PATENT DOCUMENTS

| 4,638,295 | A | * | 1/1987 | Middlebrook | ......... B60Q 1/385 701/1 |
| 2006/0027405 | A1 | * | 2/2006 | Witzenberger | ........ B62D 11/00 180/6.66 |
| 2010/0204866 | A1 | * | 8/2010 | Moshchuk | ......... B62D 15/0285 701/25 |
| 2012/0004809 | A1 | * | 1/2012 | Sasajima | .............. B62D 15/028 701/1 |
| 2012/0173080 | A1 | * | 7/2012 | Cluff | .................... B62D 15/028 701/41 |
| 2014/0058587 | A1 | * | 2/2014 | Leinfelder | ......... B62D 15/0285 701/2 |
| 2014/0277893 | A1 | * | 9/2014 | Rosol | ....................... B62D 1/28 701/23 |
| 2016/0325779 | A1 | * | 11/2016 | Zwicky | ................. B60W 30/09 |

OTHER PUBLICATIONS

Translation of First Office Action corresponding to Chinese Patent Application for Invention No. 202110190230.9 dated Oct. 10, 2022, 13 pages.

\* cited by examiner

*Primary Examiner* — Andrew J Cromer
(74) *Attorney, Agent, or Firm* — Dickinson Wright PLLC (57) ABSTRACT

A steering control system comprises a processor and a memory. The memory includes instructions that, when executed by the processor, cause the processor to: determine a steering direction of a vehicle; determine a selected gear of the vehicle; generate a first steering control value based on the steering direction and the selected gear; selectively control steering of the vehicle based on the first steering control value; in response to the selected gear changing, generate a second steering control value based on the steering direction and a second selected gear; and selectively control steering of the vehicle based on the second steering control value.

11 Claims, 5 Drawing Sheets

VEHICLE STEERING CONTROL SYSTEM

TECHNICAL FIELD

This disclosure relates to vehicles and in particular to systems and methods for a controlling steering of vehicles.

BACKGROUND

Vehicles, such as cars, trucks, sport utility vehicles, crossovers, mini-vans, or other suitable vehicles, are increasingly provided with advanced technology that offers operators of such vehicles various advanced features. For example, typical vehicles may include advanced mirror control, complex engine control, driver assist features (e.g., adaptive cruise control, and the like), complex safety features, and the like.

While such features provide the operator with improved functionality and/or various conveniences, certain aspects of operating a vehicle remain relatively cumbersome. For example, when parallel parking or when leaving a parallel parking spot, the operator may alternate between rotating a steering mechanism, such as a steering wheel, to a full lock position in one direction (e.g., to one side) and rotating the steering mechanism to a full lock position in the opposite direction (e.g., the opposite side). The operator may continue to alternate between rotating the steering mechanism to the full lock position on one side to the full lock position on the opposite side, until the vehicle is parked. Because more torque is required to steer wheels (e.g., using the steering mechanism) of a vehicle when stationary, more effort is exerted by the operator when maneuvering the vehicle in such a manner. This can be cumbersome and stressful for the operator and can result in damage to the vehicle or other property.

SUMMARY

This disclosure relates generally to a steering control system for vehicles.

An aspect of the disclosed embodiments includes a steering control system of a vehicle. The steering control system comprises a processor and a memory. The memory includes instructions that, when executed by the processor, cause the processor to: determine a steering direction of a vehicle; determine a selected gear of the vehicle; generate a first steering control value based on the steering direction and the selected gear; selectively control steering of the vehicle based on the first steering control value; in response to the selected gear changing, generate a second steering control value based on the steering direction and a second selected gear; and selectively control steering of the vehicle based on the second steering control value.

Another aspect of the disclosed embodiments includes a vehicle steering control system. The system includes a user interface, a first sensor, a controller, and a motor. The user interface is configured to receive a steering control selection, the steering control selection indicating one of a park mode or a pull away mode. The first sensor is configured to detect a selected gear of a vehicle. The controller is configured to: receive, from the user interface, steering control selection; receive, from the first sensor, a first signal indicating the selected gear of the vehicle; and in response to receiving a second signal indicating another selected gear, generate another steering control output based on the steering control selection and the other selected gear. The motor is configured to control steering of the vehicle according to the steering control output and the other steering control output.

Another aspect of the disclosed embodiments includes a method for controlling steering of a vehicle. The method includes determining a steering direction of a vehicle. The method also includes determining a selected gear of the vehicle. The method also includes generating a first steering control value based on the steering direction and the selected gear. The method also includes selectively controlling steering of the vehicle based on the first steering control value. The method also includes in response to the selected gear changing, generating a second steering control value based on the steering direction and a second selected gear. The method also includes selectively controlling steering of the vehicle based on the second steering control value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, are increasingly provided with advanced technology that offers operators of such vehicles ore advanced features. For example, typical vehicles may include advanced mirror control, complex engine control, driver assist features (e.g., adaptive cruise control, and the like), complex safety features, and the like.

While such features provide the operator with improved functionality and/or various conveniences, certain aspects of operating a vehicle remain relatively cumbersome. For example, when parallel parking or when leaving a parallel parking spot, the operator may alternate between rotating a steering mechanism, such as a steering wheel, a full lock to one side and rotating the steering mechanism a full lock to the opposite side. The operator may continue to alternate between rotating the steering mechanism to a full lock on one side to a full lock on the opposite side, until the vehicle is parked. Because more torque is required to steer wheels (e.g., using the steering mechanism) of a vehicle when stationary, more effort is exerted by the operator when maneuvering the vehicle in such a manner. This can be cumbersome and stressful for the operator and can result in damage to the vehicle or other property.

Accordingly, systems and methods, such as those described herein, that provide steering assistance to the operator when parallel parking or pulling out of a parallel parking space, may be desirable. In some embodiments, the systems and methods described herein may be configured to fully lock a steering mechanism of a vehicle to the left or to the right with a driver gear input of drive or reverse, respectively. In some embodiments, the systems and methods described herein may be configured to receive an input indicating a parking direction or a pull out direction (e.g., to the left or to the right of the vehicle). The systems and methods described herein may be configured to turn on or be engaged in response to receiving the input.

In some embodiments, the systems and methods described herein may be configured to instruct an operator to disengage (e.g., remove hands from) a steering mechanism (e.g., a steering wheel). The systems and methods described herein may be configured to determine whether the steering mechanism engaged (e.g., hands on the steering mechanism) or disengaged (e.g. hands off of the steering mechanism) by the operator. The systems and methods described herein may be configured to disengage (e.g., stop steering control) in response to the operating engaging the steering mechanism. In some embodiments, the systems and methods described herein may be configured to engage steering control, in response to the steering mechanism being disengaged by the operator.

In some embodiments, the systems and methods described herein may be configured to determine whether a selected gear of the vehicle indicates a reverse or a drive mode. If the vehicle is in reverse, the systems and methods described herein may be configured to control steering to the fully locked position in a direction opposite to the direction indicated by the input. Conversely, if the vehicle is in drive, the systems and methods described herein may be configured to control steering to the fully locked position a direction indicated by the input. The systems and methods described herein may be configured to, again, determine whether the steering mechanism is engaged or disengaged. If the steering mechanism is disengaged, the systems and methods described herein may be configured to continue steering control of the vehicle and repeats the process above. However, if on the steering mechanism is engaged, the systems and methods described herein may be configured to disengaged steering control (e.g., gives back steering control to the operator). In some embodiments, the systems and methods described herein may be configured to allow the operator to engage the steering mechanism while engaging steering control of the vehicle.

In some embodiments, the systems and methods described herein, may be configured to reduce operator effort when interacting with a steering mechanism (e.g., moving a steering wheel multiple times). The systems and methods described herein may be configured to reduce or eliminate the need for sensing devices (e.g., ultrasonic sensors) for such steering control. The systems and methods described herein may be configured to reduce or eliminate closed loop trajectory planning. The systems and methods described herein may be configured to provide, while engaging steering control, the operator full control of throttle and braking of the vehicle. The systems and methods described herein may be configured to exploit the fact that the fastest way to get in or out of a parking space is to fully lock a steering mechanism alternately left and right per gear selection. The systems and methods described herein may be configured to leverage, when engaging steering control, parking sensors to alert the operator of obstacle proximity.

Figure 1:
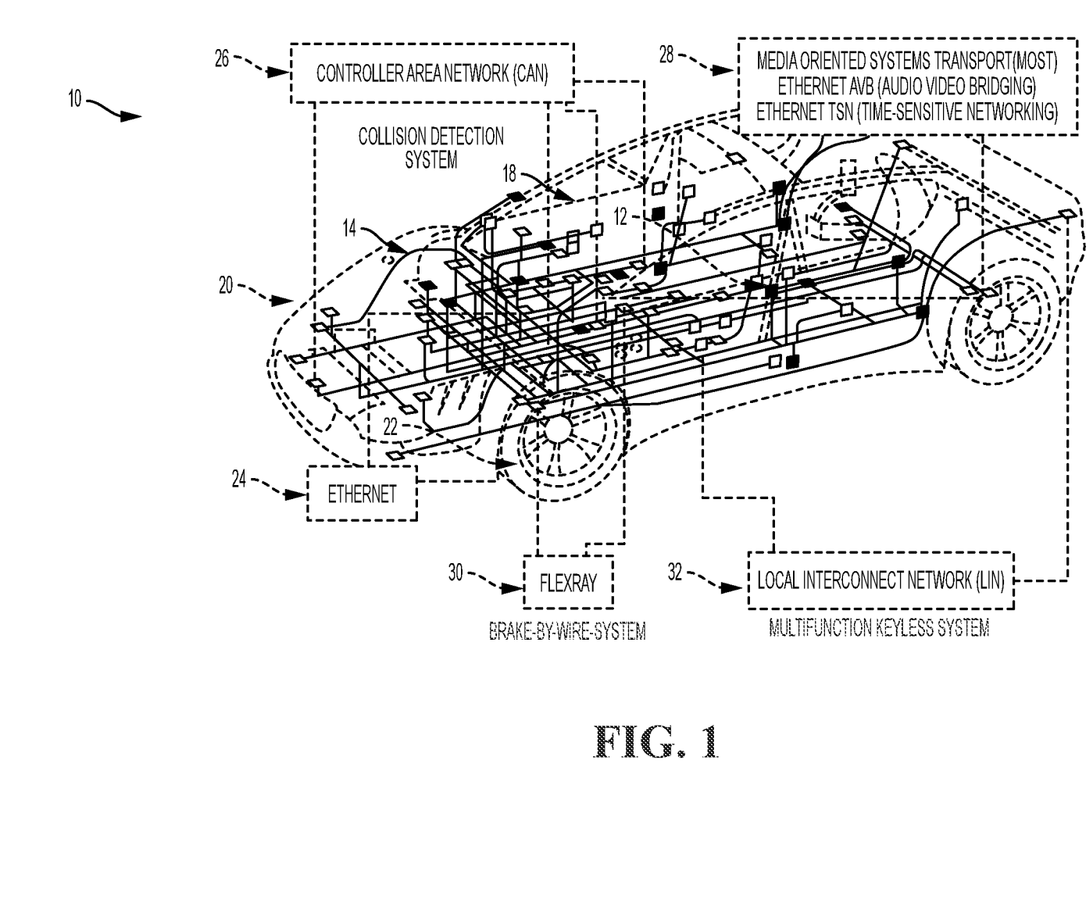
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. In some embodiments, the vehicle 10 is configured for domain control with over-the-air programming support. For example, as described, the vehicle 10 may receive updates for any suitable software component of the vehicle 10, via the Internet (e.g., or other suitable network). The vehicle 10 may update or change software components based on the update. The vehicle 10 may include additional or fewer features than those generally illustrated and/or disclosed herein.

Figure 2:
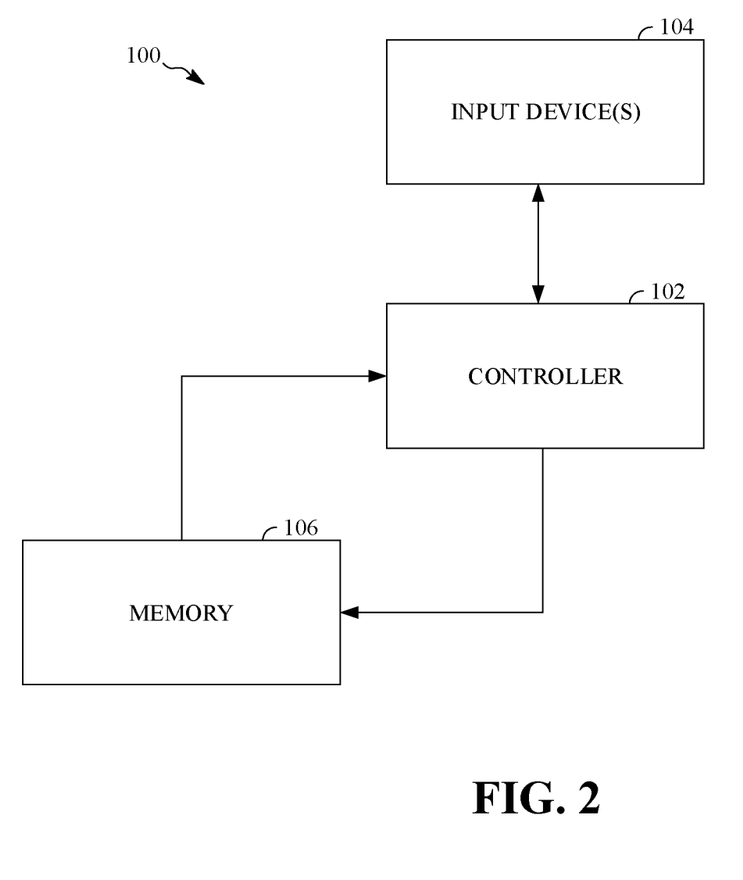
FIG. 2 generally illustrates a steering control system according to the principles of the present disclosure.

The vehicle 10 may include a steering control system 100 as is generally illustrated in FIG. 2. The system 100 may be configured to assist an operator of the vehicle 10 in maneuvering in or out of a parking space by controlling steering of to the vehicle 10. The system 100 may include a controller 102, one or more input devices 104, and a memory 106. The controller 102 may include any suitable controller, such as a vehicle electronic control unit, a processor, or any other suitable controller, such as those described herein.

The controller 102 may be in communication with the memory 106. The memory 106 may include any suitable non-volatile or volatile memory. The memory 106 may include a memory array, a memory storage device, or any other suitable memory. The memory 106 may include instructions that, when executed by the controller 102, cause the controller 102 to, at least, control steering of the vehicle 10. Additionally, or alternatively, the instructions, when executed by the controller 102, may cause the controller 102 to perform various other functions of the vehicle 10. The controller 102 may be further configured to receive input from the input devices 104.

The input devices 104 may include any suitable input device or a plurality of suitable input devices. For example, the input devices 104 may include an image-capturing device (e.g., a camera or other suitable image-capturing device), a radar sensor, a LIDAR sensor, a global positioning system (GPS) sensor, a sonar sensor, other suitable sensors, or a combination thereof. The input devices 104 are configured to measure various characteristics of the vehicle 10 and/or an environment external to the vehicle 10. The input devices 104 may communicate the measured characteristics to the controller 102.

In some embodiments, the input devices 104 include one or more torque sensors, one or more angular positions sensors, one or more other suitable sensors, or a combination thereof. The input devices 104 may be disposed proximate the steering mechanism of the vehicle 10. The input devices 104 may be configured to measure a torque value corresponding to an amount of torque applied to the steering mechanism. Additionally, or alternatively, the input devices 104 may be configured to measure an angular position of the steering mechanism relative to a reference position of the steering mechanism.

The controller 102 may receive, from the input devices 104, the measured characteristics. For example, the controller 102 may receive one or more measurements corresponding to a torque value, an angular position, or other suitable measured characteristic of the steering mechanism. The controller 102 may be configured to determine a steering direction of the vehicle 10 based on the measured characteristics of the steering mechanism. For example, the controller 102 may determine a steering direction of the vehicle 10 using a measured angular position of the steering mechanism. The steering direction of the vehicle 10 may include a direction (e.g., left or right) from a perspective of the operator. The steering direction indicates a direction required to park the vehicle 10 in a parallel parking space or to pull the vehicle 10 out of a parallel parking space.

In embodiments, the operator of the vehicle 10 may indicate required (e.g. to park in or pull out of the parallel parking space) steering direction by actuating a turn signal of the vehicle to a first position (e.g., indicating a first side of the vehicle 10) or to a second position (e.g., indicating an opposite side of the vehicle 10). The controller 102 may be configured to receive an input indicating the position of the turn signal. For example, the controller 102 may receive an input indicating that the turn signal is in the first position, which may represent an intent of the operator to move the vehicle 10 to the right to park in the parallel parking space. Conversely, the input may indicate that the turn signal is in the second position, which may represent an intent of the operator to move the vehicle 10 to the left to pull out of the parallel parking space. While left and right directions are described herein as corresponding to pulling out of the parallel parking space and parking in the parallel parking space, respectively, it should be understood that right and left direction may correspond to pulling out of the parallel parking space and parking in the parallel parking space, respectively (e.g., such as in countries that operate vehicles on the left-hand side of the road), without deviated from the scope of the embodiments described herein.

In some embodiments, the controller 102 may receive input from a driver monitoring system that measures various characteristics of an environment internal to (e.g., in the cabin) of the vehicle 10. The driver monitoring system may include one or more image-capturing devices, such as a camera, a passive infrared sensor, or a wearable that tracks the movement of the operator. The driver monitoring system captures image data of the operator. The controller 102 may use the image data to determine the desired direction of the vehicle 10. For example, the controller 102 may receive image data of a positioning of a turn signal from the driver monitoring system. In some situations the operator may not use the turn signal (e.g., because the vehicle 10 does not have one, because it is more cumbersome to use the turn signal, and the like). In some embodiments, because the driver monitoring system may use a convolutional neural network that is trained to determine where the operator is looking. The controller 102 may be configured to determine the direction based on the determination of where the driver is looking. Additionally, or alternatively, the driver monitoring system may track additional indications (e.g., a head pose or movement of the operator, gaze vector, and the like)

that the controller 102 may use to determine the desired direction that the operator intends to move or steer the vehicle 10.

The input devices 104 may be configured to measure or capture image data corresponding to an environment external to the vehicle 10 within a field of vision of the input devices 104 and/or various other data, such as radar data, LIDAR data, sonar data, GPS data, other suitable data, or a combination of image data and the various other data. The image data may indicate a position of the wheels of the vehicle 10 relative to a road, a curb, other vehicles, and/or other property. For example, the controller 102 may use image data of one or more parking space indicators to identify the direction to park in or pull out of a parking space. Additionally, or alternatively, the controller 102 may use the convolutional neural network described herein to detect the one or more parking space indicators.

In some embodiments, the input devices 104 may include a user interface disposed within the vehicle 10. For example, the user interface may be disposed in a dashboard of the vehicle 10. The user interface may include a display, a switch, or other suitable user interface. The user interface may be configured to receive a steering control selection from the operator. For example, the operator may interact with the user interface (e.g., via touch, speech, etc.,) to select the desired direction and a desired action. The desired action may include parallel parking or pulling out of a parallel parking spot. The user interface may be configured to enable the operator to initiate the steering control system 100 and convey the direction that the operator desires to steer or move the vehicle 10. The user interface may communicate the steering control selection to the controller 102.

In some embodiments, the input devices 104 may communicate to the controller 102 input including data representing a selected gear (i.e., a gear that a vehicle is currently in, such as drive, reverse, etc.,) of the vehicle 10. For example, after the operator puts the vehicle 10 in reverse, a driver monitoring system may capture an image of a placement of a gearshift in reverse and the controller 102 may receive an input including image data of the placement of the gearshift in reverse from the driver monitoring system. Additionally, or alternatively, an input may include data representing the selected gear generated by and communicated from a gear position sensor that monitors a shift rail position of a gearbox of the vehicle 10.

In some embodiments, the controller 102 may perform the methods described herein. However, the methods described herein as performed by controller 102 are not meant to be limiting, and any type of software executed on a controller can perform the methods described herein without departing from the scope of this disclosure. For example, a controller, such as a processor executing software within a computing device, can perform the methods described herein.

Figure 3:
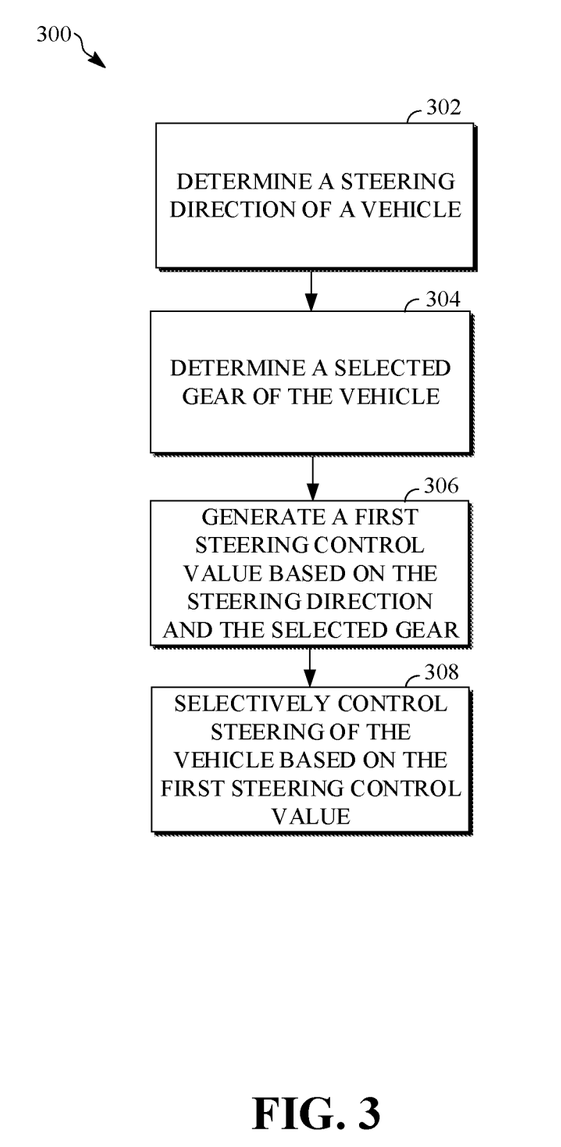
FIG. 3 is a flow diagram generally illustrating of a steering control method according to the principles of the present disclosure.

FIG. 3 is a flow diagram generally illustrated a steering control method 300 according to the principles of the present disclosure. At step 302, the method 300 determines a steering direction of a vehicle. For example, the controller 102 determines the steering direction of the vehicle 10. At 304, the method 300 determines a selected gear of the vehicle. For example, the controller 102 determines a selected gear of the vehicle 10. At step 306, the method generates a first steering control value based on the steering direction and the selected gear. For example, the controller 102 generates a first steering control value based on the steering direction and the selected gear. At step 308, the method 300 selectively controls steering of the vehicle based on the first steering control value. For example, the controller 102 selectively controls steering of the vehicle 10 based on the first steering control value. In some embodiments, the controller 102 may use artificial intelligence such as machine learning, a neural network (e.g., a convolutional neural network or other suitable neural network), and the like to determine a steering direction of the vehicle 10 using the image data and/or other various data received from the input devices 104. For example, as described, the input devices 104 may include an image-capturing device that captures images of internal and external environments of the vehicle 10 within a field of vision of the image-capturing device. In some embodiments, the field of vision may include a portion of the environment external to the vehicle 10 that is within the travel path of the vehicle 10. The controller 102 may process this image data and/or other types of data (e.g., analog voltage outputs generated by sensors that are converted to a digital number using an analog-to-digital converter) collected by the input devices 104 to determine a steering direction of a vehicle.

Additionally, or alternatively, the controller 102 may use a steering control value (e.g., a steering command) to control steering of the vehicle 10. For example, in some embodiments, at steps 302 and 304 of FIG. 3, the controller 102 determines a steering direction of "right" that indicates a direction the operator wants to move the vehicle 10 to park and a selected gear of "reverse" that indicates a gear the operator has placed the vehicle 10 in. The controller 102 may generate a steering control value that causes the steering control system 100 to turn wheels of the vehicle 10 completely to the left. In some embodiments, the operator desire t0 pull the vehicle 10 out left from a parallel parking space. The controller 102 may determine a steering direction of "left" and a selected gear of "reverse" following the operator placing the vehicle 10 in reverse. The controller 102 may generate a steering control value that causes the steering control system 100 to turn wheels of the vehicle 10 completely to the right.

In some embodiments, the controller 102 may control steering of the vehicle 10 by actuation of one or more motors that control a direction that wheels of the vehicle turn. In particular, the controller 102 may control the rotation of the one or more motors based on a steering control value and the rotation of the one or more motors may in turn cause the wheels of the vehicle 10 to turn completely right or completely left. The controller 102 may also control other mechanisms used to turn the wheels of the vehicle 10.

In some instances, the operator may need to maneuver the vehicle 10 several times to park in or pull out of a parallel parking space. Accordingly, the steering control system 100 may provide assistance.

Figure 4:
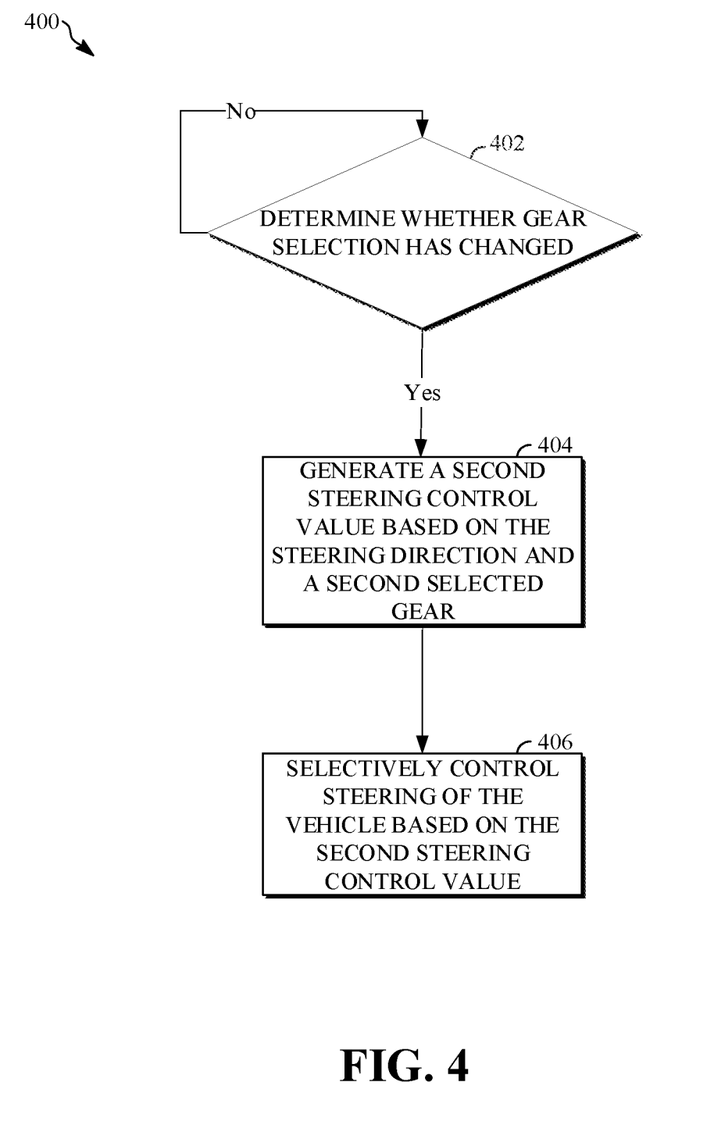
FIG. 4 is a flow diagram generally illustrating an alternative steering control method according to the principles of the present disclosure.

FIG. 4 is a flow diagram generally illustrating an alternative steering control method 400 according to the principles of the present disclosure. At step 402, the method 400 determines whether gear selection has changed. For example, the controller 102 determines whether gear selection has changed. At step 404, the method 400 generates a second steering control value based on the steering direction and a second selected gear. At step 404, the controller 102 generates a second steering control value based on the steering direction and a second selected gear. At step 406, the method 400 selectively controls steering of the vehicle based on the second steering control value. At step 406, the controller 102 selectively controls steering of the vehicle 10 based on the second steering control value.

In some embodiments, the controller 102 determines a steering direction of "right" that indicates a direction the operator wants to move the vehicle 10 to park and a selected gear of "reverse" that indicates a gear that the operator has placed the vehicle 10 in. The controller 102 may generate a first steering control value that causes the steering control system 100 to turn wheels of the vehicle 10 completely to the left, enabling the operator to reverse the vehicle 10 into the parking space without interacting with any steering mechanism of the vehicle 10. Following the reversing of the vehicle, and in response to the operator placing the vehicle 10 into drive from reverse, the controller 102 may generate a second steering control value based on the second selected gear of "reverse" and the steering direction of "right." In this example, the second steering control value will cause the steering control system 100 to turn the wheels of the vehicle 10 completely to the right. The operator may then maneuver the vehicle 10 forward into the spot without interacting with any steering mechanism of the vehicle 10. This process may be repeated until the vehicle 10 is aligned in the parking space. When operator selects reverse or drive, the steering control system 100 causes the wheels to turn right or left, respectively. Generally, in embodiments, if the vehicle 10 is in reverse, the steering control system 100 may cause the wheels of the vehicle 10 to turn in a direction opposite to the determined steering direction and if the vehicle 10 is in drive, the steering control system 100 may cause the wheels of the vehicle 10 to turn in a same direction as the determined steering direction.

In some embodiments, the steering control system 100 may also cause a steering mechanism (e.g., a steering wheel) to rotate as the wheels of the vehicle 10 turn—thereby allowing the operator to observe a representation of the wheels of the vehicle 10 turning from a cabin of the vehicle 10.

Figure 5:
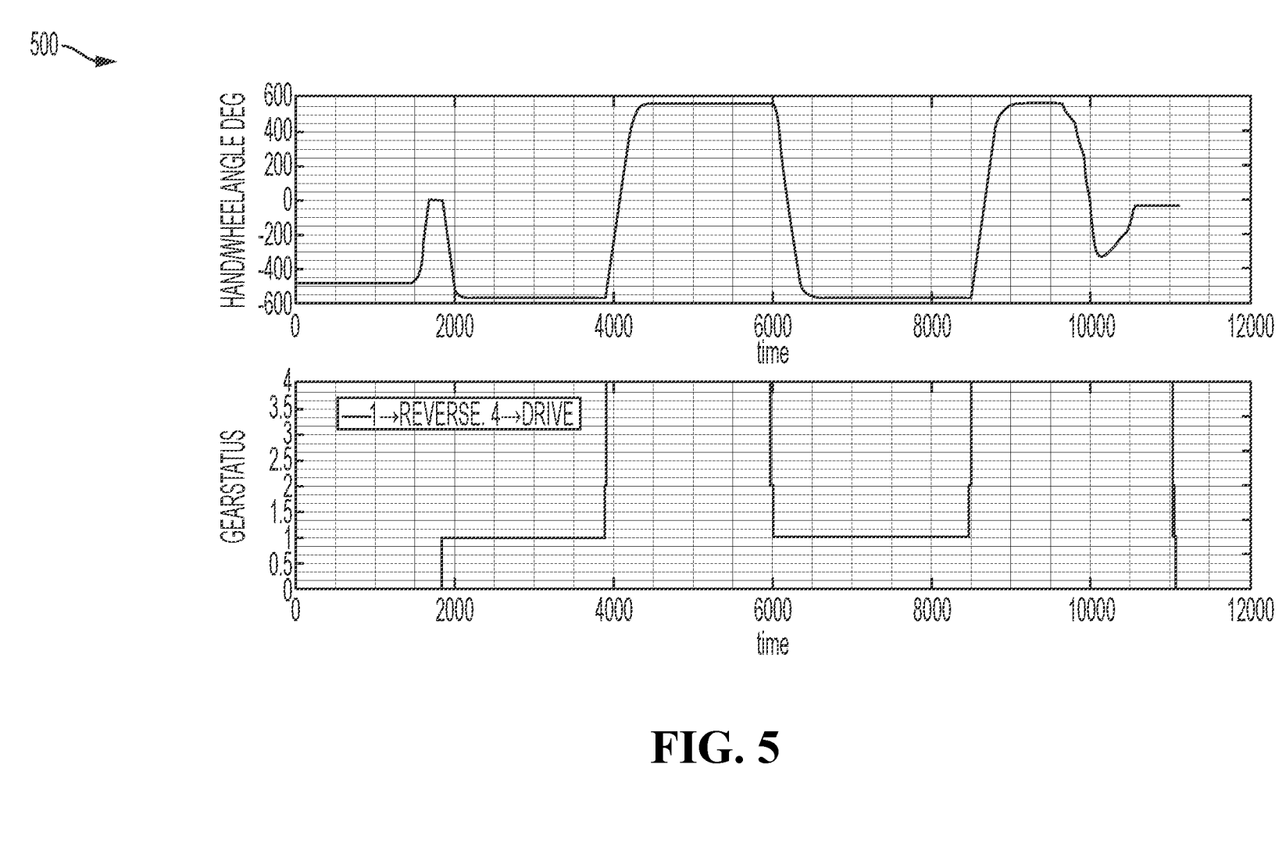
FIG. 5 is a graph representing implementation of a steering control system according to the principles of the present disclosure.

FIG. 5 displays a first graph of hand wheel or steering wheel angle plotted versus time and a second graph of gear status versus time. As shown in FIG. 5, during a period from t2000 to t4000, the gear status of the vehicle 10 is reverse and the steering wheel is rotated to a maximum rotation angle in a counter clockwise direction (or left). During a period from t4000 to t6000, the gear status of the vehicle 10 is drive and the steering wheel is rotated to a maximum rotation angle in a clockwise direction (or right). In some embodiments, the operator may disengage the steering control system 100 and take back control of steering by placing a hand on a steering mechanism. For example, the controller 102 may discontinue steering control of the vehicle 10 in response to a determination that the operator of the vehicle 10 has engaged the steering mechanism of the vehicle 10. Still yet, the controller 102 may provide an instruction to the operator of the vehicle 10 to disengage the steering mechanism of the vehicle 10 (e.g., by instructing the operator to remove a hand from the steering wheel). In other embodiments, the steering control system 100 may not cause the steering mechanism, such as the steering wheel, to rotate as the wheels of the vehicle 10 turn and hands of the operator on a steering will not disengage the steering control system 100.

In some embodiments, a steering control system includes a processor and a memory. The memory includes instructions that, when executed by the processor, cause the processor to: determine a steering direction of a vehicle; determine a selected gear of the vehicle; generate a first steering control value based on the steering direction and the selected gear; selectively control steering of the vehicle based on the first steering control value; in response to the selected gear changing, generate a second steering control value based on the steering direction and a second selected gear; and selectively control steering of the vehicle based on the second steering control value.

In some embodiments, the memory further includes instructions that, when executed by the processor, cause the processor to: discontinue steering control of the vehicle in response to a determination that an operator of the vehicle has engaged a steering mechanism of the vehicle. In some embodiments, the second steering control value is opposite the first steering control value. In some embodiments, the memory further includes instructions that, when executed by the processor, cause the processor to: provide an instruction to an operator of the vehicle to disengage a steering mechanism of the vehicle. In some embodiments, the selected gear is reverse and the first steering control value causes wheels of the vehicle to turn in a direction opposite to the steering direction. In some embodiments, the selected gear is drive and the first steering control value causes wheels of the vehicle to turn in the steering direction. In some embodiments, the memory further includes instructions that, when executed by the processor, cause the processor to: selectively control steering of the vehicle based on the first steering control value by causing wheels of the vehicle to turn in a direction while a steering mechanism of the vehicle is stationary.

In some embodiments, a vehicle steering control system a user interface, a first sensor, and a controller. The user interface is configured to receive a steering control selection, the steering control selection indicating one of a park mode or a pull away mode. The first sensor is configured to detect a selected gear of a vehicle. The controller is configured to: receive, from the user interface, steering control selection; receive, from the first sensor, a first signal indicating the selected gear of the vehicle; and generate a steering control output based on the steering control selection and the selected gear; in response to receiving a second signal indicating another selected gear, generate another steering control output based on the steering control selection and the other selected gear; and a motor configured to control steering of the vehicle according to the steering control output and the other steering control output.

In some embodiments, the controller is further configured to: discontinue steering control of the vehicle in response to a determination that an operator of the vehicle has engaged a steering mechanism of the vehicle. In some embodiments, the other steering control output is opposite the steering control output. In some embodiments, the controller is further configured to: provide an instruction to an operator of the vehicle to disengage a steering mechanism of the vehicle. In some embodiments, the selected gear is reverse and the first steering control output causes wheels of the vehicle to turn in a direction opposite to the steering control selection. In some embodiments, the selected gear is drive and the first steering control output causes wheels of the vehicle to turn in a direction of the steering control selection. In some embodiments, the controller is further configured to: control steering of the vehicle according to the steering control output and the other steering control output by causing wheels of the vehicle to turn in a direction while a steering mechanism of the vehicle is stationary.

In some embodiments, a method for controlling steering of a vehicle includes determining a steering direction of a vehicle. The method also includes determining a selected gear of the vehicle. The method also includes generating a first steering control value based on the steering direction and the selected gear. The method also includes selectively controlling steering of the vehicle based on the first steering control value. The method also includes in response to the selected gear changing, generating a second steering control value based on the steering direction and a second selected gear. The method also includes selectively controlling steering of the vehicle based on the second steering control value.

In some embodiments, the method further includes discontinuing steering control of the vehicle in response to a determination that an operator of the vehicle has engaged a steering mechanism of the vehicle. In some embodiments, the second steering control value is opposite the first steering control value. In some embodiments, the method further includes providing an instruction to an operator of the vehicle to disengage a steering mechanism of the vehicle. In some embodiments, the selected gear is reverse and the first steering control output causes wheels of the vehicle to turn in a direction opposite to the steering control selection. In some embodiments, the selected gear is drive and the first steering control output causes wheels of the vehicle to turn in a direction of the steering control selection.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A steering control system for providing steering assistance to an operator of a vehicle when pulling out of a parallel parking space, the steering control system comprising:
   a processor; and
   a memory that includes instructions that, when executed by the processor, cause the processor to:
   determine a first steering direction of a vehicle based on a direction the operator is looking, wherein the direction the operator is looking indicates a direction that the operator intends to move the vehicle to pull out of the parallel parking space;
   determine a selected gear of the vehicle as selected by the operator of the vehicle; and
   in response to the first steering direction and the selected gear being a forward gear of the vehicle, generate a first steering control value to control steering of the vehicle to a first full lock position in the first steering direction and, in response to the selected gear being a reverse gear of the vehicle, generate a second steering control value to control steering of the vehicle to a second full lock position in a second steering direction opposite the first steering direction such that the operator of the vehicle changing the selected gear from the forward gear to the reverse gear causes steering of the vehicle to alternate from the first full lock position to the second full lock position and the operator of the vehicle changing the selected gear from the reverse gear to the forward gear causes the steering of the vehicle to alternate from the second full lock position to the first full lock position.

2. The steering control system of claim 1, wherein the memory further includes instructions that, when executed by the processor, cause the processor to:
discontinue steering control of the vehicle in response to a determination that the operator of the vehicle has engaged a steering mechanism of the vehicle.

3. The steering control system of claim 1, wherein the memory further includes instructions that, when executed by the processor, cause the processor to:
provide an instruction to the operator of the vehicle to disengage a steering mechanism of the vehicle.

4. The steering control system of claim 1, wherein the memory further includes instructions that, when executed by the processor, cause the processor to:
selectively control steering of the vehicle based on the first steering control value by causing wheels of the vehicle to turn in a direction while a steering mechanism of the vehicle is stationary.

5. A vehicle steering control system for providing steering assistance to an operator of a vehicle when pulling out of a parallel parking space, the vehicle steering control system comprising:
a first sensor configured to detect a selected gear of the vehicle as selected by the operator;
a second sensor configured to detect a direction that the operator is looking;
a controller configured to:
receive, from the first sensor, a first signal indicating the selected gear of the vehicle;
receive, from the second sensor, a second signal indicating the direction the operator is looking;
generate a steering control output based on the selected gear and the direction the operator is looking, wherein the direction the operator is looking indicates a first steering direction that the operator intends to move the vehicle to pull out of the parallel parking space; and
in response to receiving a third signal indicating another selected gear that the operator puts the vehicle in, generate another steering control output based on the steering control selection and the other selected gear; and
a motor configured to control steering of the vehicle according to the steering control output and the other steering control output, wherein
in response to a determination that the selected gear is a forward gear of the vehicle, the controller causes the motor to control steering of the vehicle to a first full lock position in the first steering direction,
in response to a determination that the selected gear is a reverse gear of the vehicle, the controller causes the motor to control steering of the vehicle to a second full lock position in a second steering direction opposite the first steering direction,
in response to the selected gear changing from the forward gear to the reverse gear, the controller causes the motor control steering of the vehicle to alternate from the first full lock position to the second full lock position; and
in response to the selected gear changing from the reverse gear to the forward gear, the controller causes the motor to control steering of the vehicle to alternate from the second full lock position to the first full lock position.

6. The vehicle steering control system of claim 5, wherein the controller is further configured to:
discontinue steering control of the vehicle in response to a determination that the operator of the vehicle has engaged a steering mechanism of the vehicle.

7. The vehicle steering control system of claim 5, wherein the controller is further configured to:
provide an instruction to the operator of the vehicle to disengage a steering mechanism of the vehicle.

8. The vehicle steering control system of claim 5, wherein the controller is further configured to:
control steering of the vehicle according to the steering control output and the other steering control output by causing wheels of the vehicle to turn in a direction while a steering mechanism of the vehicle is stationary.

9. A method for providing steering assistance to an operator of a vehicle when pulling out of a parallel parking space, the method comprising:
determining a first steering direction of a vehicle based on an indication that represents a direction that the operator intends to move the vehicle to pull out of the parallel parking space, wherein the indication is a direction the operator is looking;
determining a selected gear of the vehicle as selected by the operator; and
in response to the first steering direction and the selected gear being a forward gear of the vehicle, generating a first steering control value to control steering of the vehicle to a first full lock position in the first steering direction and, in response to the selected gear being a reverse gear of the vehicle, generating a second steering control value to control steering of the vehicle to a second full lock position in a second steering direction opposite the first steering direction such that the operator of the vehicle changing the selected gear from the forward gear to the reverse gear causes steering of the vehicle to alternate from the first full lock position to the second full lock position and the operator of the vehicle changing the selected gear from the reverse gear to the forward gear causes the steering of the vehicle to alternate from the second full lock position to the first full lock position.

10. The method of claim 9, further comprising:
discontinuing steering control of the vehicle in response to a determination that the operator of the vehicle has engaged a steering mechanism of the vehicle.

11. The method of claim 9, further comprising:
providing an instruction to the operator of the vehicle to disengage a steering mechanism of the vehicle.

* * * * *